United States Patent [19]
Pecone et al.

[11] Patent Number: 5,745,795
[45] Date of Patent: Apr. 28, 1998

[54] SCSI CONNECTOR AND Y CABLE CONFIGURATION WHICH SELECTIVELY PROVIDES SINGLE OR DUAL SCSI CHANNELS ON A SINGLE STANDARD SCSI CONNECTOR

[75] Inventors: Victor Pecone; Jay Lory, both of Austin, Tex.

[73] Assignee: Dell USA, L.P., Round Rock, Tex.

[21] Appl. No.: 743,091

[22] Filed: Nov. 4, 1996

Related U.S. Application Data

[63] Continuation of Ser. No. 352,254, Dec. 8, 1994, abandoned.
[51] Int. Cl.$^6$ .................................................. G06F 13/00
[52] U.S. Cl. .................. 395/882; 395/821; 395/309
[58] Field of Search ................... 395/821, 882, 395/309

[56] References Cited

U.S. PATENT DOCUMENTS

| | | | |
|---|---|---|---|
| 4,817,147 | 3/1989 | Gorniak et al. | 380/49 |
| 4,972,470 | 11/1990 | Farago | 380/3 |
| 5,159,683 | 10/1992 | Lvovsky et al. | 395/500 |
| 5,418,330 | 5/1995 | Rook | 174/78 |
| 5,467,453 | 11/1995 | Kocis | 395/281 |
| 5,577,931 | 11/1996 | Leshem | 439/497 |

*Primary Examiner*—Jack B. Harvey
*Assistant Examiner*—Sumati Lefkowitz
*Attorney, Agent, or Firm*—Skjerven, Morrill, MacPherson, Franklin & Friel; Stephen A. Terrile

[57] ABSTRACT

A SCSI controller card which includes a standard SCSI connector that can support either one or two SCSI channels, as desired. The connector can receive either a standard single channel cable or a specially designed dual channel "Y" cable to provide either one or two SCSI channels, respectively. The SCSI controller card includes logic that determines which cable is installed and switching logic which routes one or two SCSI channels to the connector accordingly. In the preferred embodiment, the SCSI adapter card includes two SCSI controllers which provide two SCSI channels. A first channel is connected directly to pins on the SCSI connector. A second channel is connected to switching logic, and a plurality of ground signals are also connected to the switching logic. The second channel is switched into the SCSI connector if the dual channel "Y" cable is attached to the connector, and the ground signals are switched into the SCSI connector if the "Y" cable is not detected. The SCSI adapter card continuously auto-senses which cable is installed at power-up, i.e., whether the dual channel "Y" cable is installed or a standard single channel cable is installed, and switches in either the second channel or ground signals accordingly. Thus the present invention provides increased connectivity from a single connector as well as modular and upgradable SCSI bus routing options. The single external SCSI connector is mechanically compliant with the SCSI standard, but allows external routing of either one or two SCSI channels.

20 Claims, 5 Drawing Sheets

External SCSI Connector
Dual Channel Pinout

| Pin # | Signal | Pin # | Signal |
|---|---|---|---|
| 1 | SDA12 | 35 | SDB12 |
| 2 | SDA13 | 36 | SDB13 |
| 3 | SDA14 | 37 | SDB14 |
| 4 | SDA15 | 38 | SDB15 |
| 5 | SDAP1 | 39 | SDBP1 |
| 6 | SDA0 | 40 | SDB0 |
| 7 | SDA1 | 41 | SDB1 |
| 8 | SDA2 | 42 | SDB2 |
| 9 | SDA3 | 43 | SDB3 |
| 10 | SDA4 | 44 | SDB4 |
| 11 | SDA5 | 45 | SDB5 |
| 12 | SDA6 | 46 | SDB6 |
| 13 | SDA7 | 47 | SDB7 |
| 14 | SDAP0 | 48 | SDBP0 |
| 15 | SCLA | 49 | SCLB |
| 16 | SDAA | 50 | SDAB |
| 17 | TERMPWRA | 51 | TERMPWRB |
| 18 | TERMPWRA | 52 | TERMPWRB |
| 19 | YLOOP | 53 | YLOOP |
| 20 | DRIVINTA | 54 | DRIVINTB |
| 21 | ANTA | 55 | ANTB |
| 22 | EXTAIN | 56 | EXTBIN |
| 23 | BSYA | 57 | BSYB |
| 24 | ACKA | 58 | ACKB |
| 25 | RSTA | 59 | RSTB |
| 26 | MSGA | 60 | MSGB |
| 27 | SELA | 61 | SELB |
| 28 | C_DA | 62 | C_DB |
| 29 | REQA | 63 | REQB |
| 30 | I_OA | 64 | I_OB |
| 31 | SDA8 | 65 | SDB8 |
| 32 | SDA9 | 66 | SDB9 |
| 33 | SDA10 | 67 | SDB10 |
| 34 | SDA11 | 68 | SDB11 |

FIG. 6

SCSI CONNECTOR AND Y CABLE CONFIGURATION WHICH SELECTIVELY PROVIDES SINGLE OR DUAL SCSI CHANNELS ON A SINGLE STANDARD SCSI CONNECTOR

This application is a continuation of application Ser. No. 08/352,254, filed Dec. 8, 1994, now abandoned.

FIELD OF THE INVENTION

The present invention relates to SCSI connector logic including a standard SCSI connector and associated switching logic, wherein the connector selectively conducts signals corresponding to one or two SCSI channels depending on whether a single channel cable or a special dual channel Y cable is attached to the connector.

DESCRIPTION OF THE RELATED ART

In order to accommodate increasing requirements for data storage and data transfer capability, several peripheral device interface standards have been developed for data storage and transfer. These interface standards provide an interface between the host computer system and data storage devices which store data. Among these are the IDE, or integrated drive electronics interface, the ESDI, or enhanced small device interface, and the SCSI bus, or small computer systems interface bus.

The SCSI bus is a system level interface that essentially provides a complete expansion bus where peripherals such as data storage devices may be connected. The SCSI bus functions as a separate bus whereby SCSI devices can exchange data among themselves without the intervention of the host computer's microprocessor. In fact, SCSI devices can perform transfers across the SCSI bus while other transfers are occurring on the host computer's normal expansion bus. Various types of devices can be connected to the SCSI bus, including hard drives, tape drives, CD-ROMs, etc. Up to seven SCSI devices can be daisy-chained to one SCSI port on one SCSI bus or SCSI channel, and these devices function independently under the control of the host system through the SCSI adapter.

Modern computer systems which include a SCSI controller typically either incorporate the SCSI controller on the computer system motherboard, or provide the SCSI controller as an add-in card or adapter card to an expansion bus, such as the PCI bus, ISA bus, or EISA bus. In a computer system which includes an internal SCSI controller, many customers/users also desire that one or more SCSI ports be externally accessible for external SCSI buses or channels. This provides the customer/user with greater expansion capabilities, allowing the user to connect SCSI devices to the computer system without having to open the computer system unit case and without requiring the SCSI device to be internally mounted within the computer system with its accompanying ribbon or cable. An external SCSI connector is also attractive as a bus route option for internal SCSI channels.

In computer systems which are used as file servers on a local area network, many times it is desirable for the computer system to include up to two (or more) external SCSI channels for various types of RAID (Redundant Arrays of Inexpensive Disks) configurations. However, there are several problems with providing two external SCSI connectors in a typical PC add-in card. First, height or length restrictions placed on the add-in board, the available real estate on the board, and signal routing issues make it very difficult and/or prohibitive to add an external SCSI connector on the SCSI adapter add-in board Printed Wire Assembly (PWA), let alone two connectors. Also, the defined mechanical I/O opening limits the size and/or number of external connectors regardless of whether these connectors are stacked or parallel. Accordingly, only one external connector can generally be provided on an adapter card. Thus, when two or more external SCSI channels are desired, two or more corresponding SCSI adapters are generally necessary. This adds cost to the system and also occupies two expansion slots, which is undesirable.

Another SCSI system design issue is upgradability. For example, a customer may purchase a computer system including a single SCSI adapter card having a single connector, and the customer may later require an additional external SCSI connector. In this instance, the customer is currently required to purchase an additional SCSI adapter to obtain a second external SCSI connector. This adds undesirable cost to the system.

Applicant is aware that Compaq Computer Corporation sells a SCSI add-in card they call their Smart Array Controller which includes a proprietary dual channel external SCSI-2 connector. The connector is a specially designed non-standard 100 pin connector and is used in conjunction with a 100 pin to dual 50 pin "Y" cable to provide two SCSI channels off of a single connector. The external 100 pin connector is on the main add-in PWA and is mechanically limited to narrow SCSI (SCSI-1 or SCSI-2). One problem with this approach is that the non-standard 100 pin connector and the special "Y" cable are relatively expensive. Also, this design is limited to narrow SCSI, i.e., SCSI-1 or SCSI-2, and cannot support the faster SCSI-3 standard. Finally, the non-standard 100 pin connector cannot receive a standard single channel SCSI cable, but rather must be used in conjunction with the special Y cable. This reduces modularity and upgradability options for the user since the user cannot use the connector for a single SCSI channel and later optionally upgrade to the dual channel "Y" cable.

Therefore, a system and method is desired which allows a single SCSI adapter card and/or a single standard SCSI connector to selectively provide either one or two SCSI channels for increased connectivity. Such a system would also provide modularity and upgradability without the associated cost of a second SCSI adapter.

Background on the SCSI connector format is deemed appropriate. The original SCSI connector pinout comprised a 50 pin connector which included 19 signal pins, 30 ground pins and a non-connect pin. In 1991, a revision of the SCSI standard referred to as SCSI-2 was introduced to help fix various problems in mating SCSI devices together, as well as to increase the speed of SCSI transfers. The SCSI-2 revision broadened the original 8-bit bus to provide 16 data lines. SCSI-2 implementations that support fast transfers (10 Mbps on an 8-bit bus or up to 20 Mbps on the 16-bit bus) are referred to as fast SCSI. SCSI implementations that use the 16-bit bus are called wide SCSI, while those which use the 8-bit bus are called narrow SCSI. The successor to the SCSI-2 standard is referred to as SCSI-3. The SCSI-3 connector pinout comprises a 68 pin connector wherein 30 pins are used for address, data and control pins while the remaining pins are designated as ground pins.

SUMMARY OF THE INVENTION

The present invention comprises a SCSI controller card which includes a standard SCSI connector that can support either one or two SCSI channels, as desired. The connector can receive either a standard single channel cable or a specially designed dual channel "Y" cable and correspondingly provides either one or two SCSI channels, respectively. The SCSI controller card includes switching logic according to the present invention that determines which cable is installed and routes one or two SCSI channels to the connector accordingly. Thus the present invention provides increased connectivity from a single standard connector as well as modular and upgradable SCSI bus routing options.

In the preferred embodiment, the SCSI adapter card includes a standard SCSI-3 external connector and two SCSI controllers which provide two SCSI channels, referred to as Bus 0 and Bus 1. In the preferred embodiment, the data and control signals from SCSI Bus 1 are connected directly to a first plurality of pins in the external connector. The data and control signals from SCSI Bus 0 are connected through switching logic to a second plurality of pins in the external connector. A plurality of ground signals are also connected through the switching logic to the second plurality of pins. The switching logic preferably comprises low impedance CMOS analog switches (crossbar type).

Cable Sense logic monitors a pin on the connector to determine whether or not the "Y" cable is connected and switches in either the SCSI Bus 0 signals or the ground signals appropriately. The SCSI adapter card continuously auto-senses which cable is installed at power-up, i.e., whether the dual channel "Y" cable is installed or a standard single channel cable is installed. If the "Y" connector is not detected, i.e., if a standard single channel cable is connected to the connector, the second plurality of pins are pulled to ground through active switches. Thus only the Bus 1 channel is provided to the connector through the first plurality of pins, with the second plurality of pins being grounded, as in a standard SCSI connector. Thus, when a standard single channel cable is inserted into the connector, the connector provides the standard data, control, and ground signals according to the SCSI-3 pinout. If the dual channel "Y" cable is detected, the switching logic routes SCSI Bus 0 to the external connector, and thus data and control signals corresponding to two SCSI channels are provided through the connector to the "Y" cable. The external connector is preferably a shielded connector or grounded connector and includes large ground lugs which provide grounds to the "Y" cable. This enables the "Y" cable to recreate the ground signals for each of the two SCSI channels.

The dual-channel SCSI "Y" cable includes a center tap which mates to the connector pinout definition of the card connector. The "Y" cable includes two legs which are pinned out as standard SCSI-3 ports, but which include an additional three hot plug signals and an external cable sense signal which allows the Cable Sense logic to detect the presence of the Y cable. These four signals were "stolen" from non-impedance critical ground signal pins. Each of the legs of the "Y" cable includes impedance matching ground wires which are ganged at the center connector and shorted to the connector shell. These ground wires provide a low RF impedance mate to the ground signals on the adapter board.

Therefore, the present invention comprises a SCSI connector and accompanying switching circuitry which allows one or two SCSI channel external routing from a single standard connector, as desired. The present invention thus provides increased connectivity with minimal cost, as well as modular and upgradable SCSI bus routing options. The single external SCSI connector is mechanically compliant with the SCSI standard, but allows external routing of either one or two SCSI channels. Two channel SCSI routing utilizes an external "Y" cable splitter according to the present invention.

BRIEF DESCRIPTION OF THE DRAWINGS

A better understanding of the present invention can be obtained when the following detailed description of the preferred embodiment is considered in conjunction with the following drawings, in which:

FIG. 6 illustrates the connector pinout of the "Y" cable according to the preferred embodiment.

DETAILED DESCRIPTION OF THE PREFERRED EMBODIMENT

Figure 1:
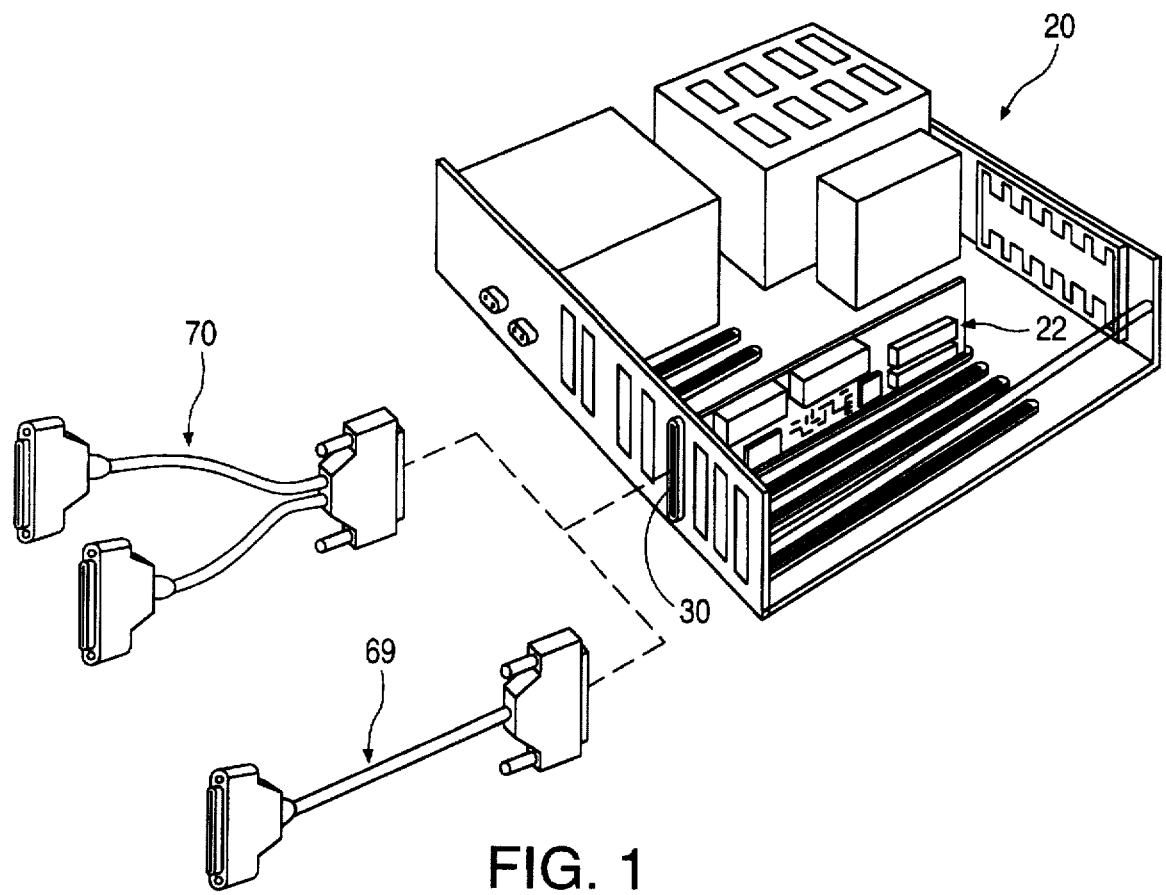
FIG. 1 illustrates a computer system incorporating a SCSI adapter which includes an external SCSI connector that can receive a single channel cable or a dual channel "Y" cable according to the present invention.

Referring now to FIG. 1, a computer system 20 incorporating a SCSI adapter 22 including an external SCSI connector 30 which can support single or dual SCSI channels according to the preferred embodiment of the invention is shown. In the embodiment shown in FIG. 1, the computer system 20 includes an expansion bus, preferably a PCI (Peripheral Component Interconnect) bus, including one or more expansion slots. SCSI adapter 22 is preferably comprised in an expansion slot in the expansion bus and includes an external SCSI connector 30. The SCSI connector 30 is a standard connector and is preferably mechanically compliant with the SCSI-3 specification. According to the present invention, as shown in FIG. 1, the SCSI connector 30 can receive either a standard single channel SCSI cable 69 or can receive a special dual channel Y cable 70 which supplies two SCSI channels from the single SCSI connector 30. This provides greatly increased connectivity from a single connector as well as modularity and upgradability for the user.

Figure 2:
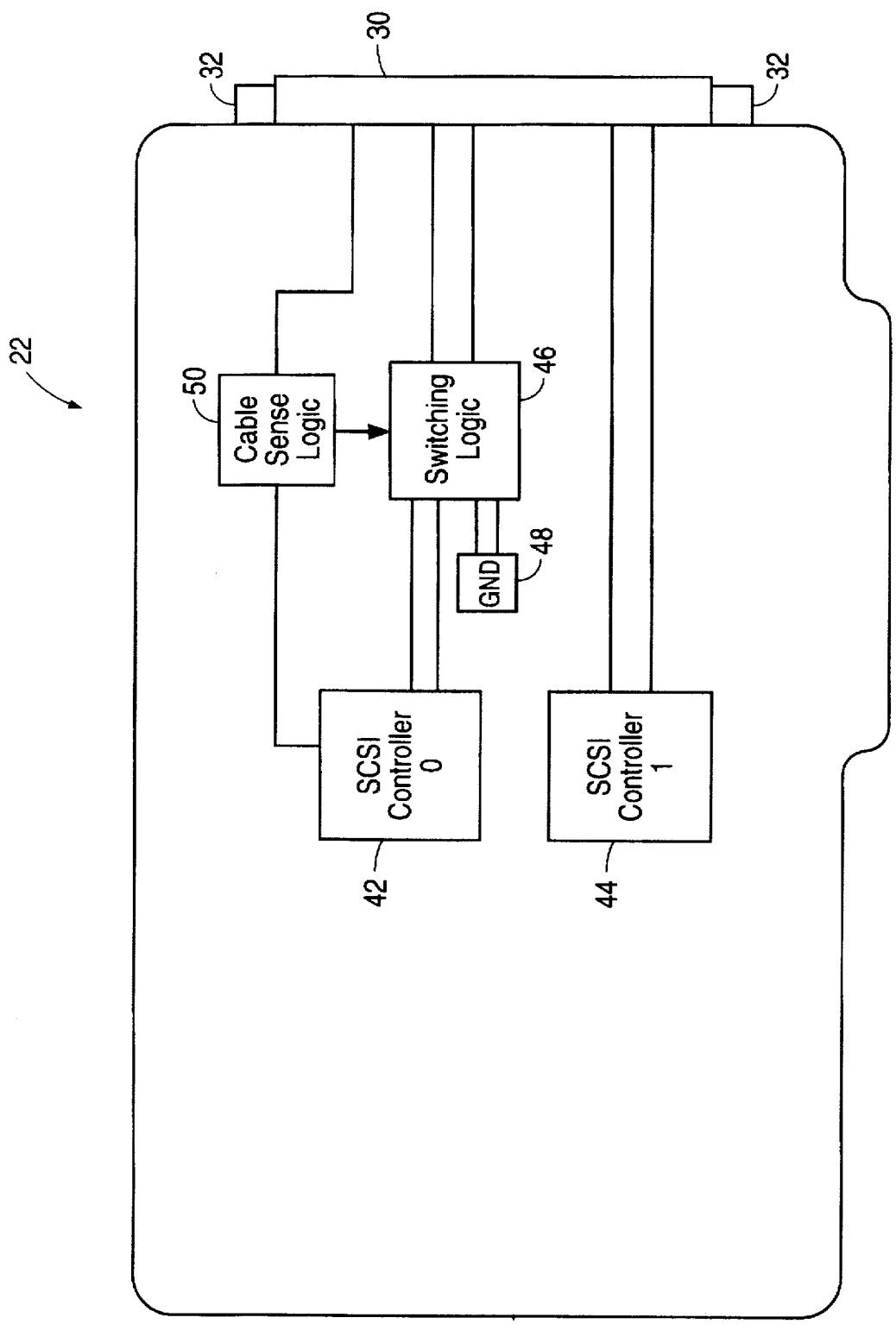
FIG. 2 is a more detailed block diagram of the SCSI adapter of FIG. 1.

It is noted that the SCSI connector 30 and associated logic of the present invention may be incorporated into a SCSI adapter add-in card which is insertable into an expansion slot on an expansion bus in the computer system, as shown in FIG. 2, or the SCSI controller and associated logic may be placed directly on the computer motherboard for either internal or external connection as desired. In one embodiment, SCSI connector 30 is comprised on a daughter board (not shown) which attaches to the SCSI adapter 22. For more information on this adapter card/daughter board configuration, please see related copending application (DC-00676) Ser. No. 08/351,848 titled "Computer System SCSI Adapter Card Including an Add-in Daughter Board Providing an External SCSI Connector For Modular and Upgradable SCSI Bus Routing Options," filed Dec. 8, 1994 which is hereby incorporated by reference as though fully set forth herein.

Referring now to FIG. 2, a block diagram of the SCSI adapter 22 according to the preferred embodiment of the invention is shown. As shown, the adapter card 22 includes two controllers, referred to as SCSI controller 0, designated by the reference numeral 42, and SCSI controller 1, designated by the reference numeral 44. SCSI controller 1 provides SCSI address, data and control signals, referred to as SCSI Bus 1 signals, to a first plurality of pins of the connector 30. SCSI controller 0 provides SCSI address, data and control signals, referred to as SCSI Bus 0 signals, to switching logic 46. A plurality of ground signals generated by element 48 are provided to the switching logic 46. The switching logic 46 outputs either of the SCSI address, data and control signals from SCSI controller 0 or the ground signals to a second plurality of pins of the connector 30. The adapter 22 includes the connector 30. The connector 30 is preferably a standard SCSI connector and preferably conforms to the SCSI-3 connector pinout format as mentioned above. The connector 30 includes ground lugs 32 which are used to provide a ground to the Y cable 70 when the Y cable 70 is inserted into the connector 30, as described further below. Ground signals from SCSI Channels 0 and 1 corresponding to SCSI controllers 0 and 1 are preferably coupled to the connector 30 to ground the connector 30. In an alternate embodiment, the connector 30 is grounded to the system chassis.

The connector 30 provides a cable sense signal to cable sense logic 50 which indicates whether the special dual channel Y cable 70 is connected to the connector 30. The cable sense logic 50 controls the operation of the switching logic 46 in determining whether to provide the SCSI address, data and control signals from SCSI controller 0 or ground signals from element 48 to the second plurality of pins on the connector 30. If the Y cable 70 is detected, the SCSI data and control signals from SCSI controller 0 are provided to the connector 30. FIG. 6 illustrates the connector pinout of the connector 30 when the Y cable is inserted into the connector 30. If the Y cable 70 is not detected, the ground signals are provided to the connector 30.

Figure 3:
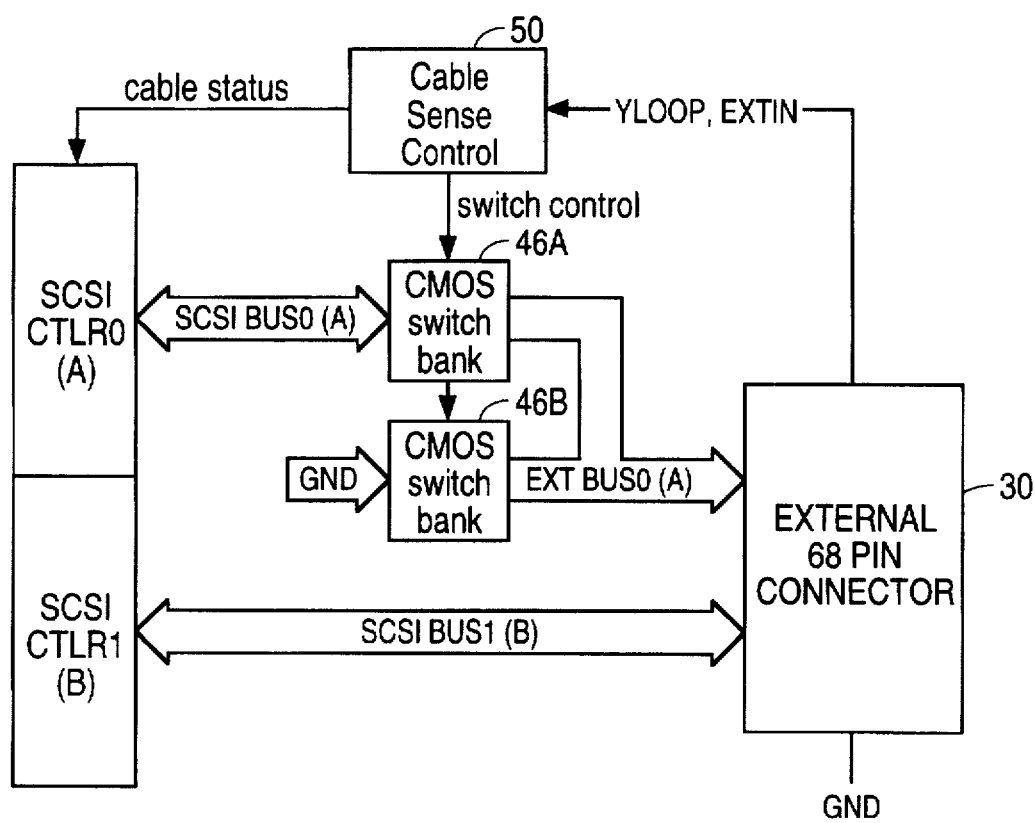
FIG. 3 illustrates the switching logic on the SCSI adapter of FIG. 2.

Referring now to FIG. 3, a more detailed diagram of the logic on the SCSI adapter 22 is shown. SCSI controller 1 provides SCSI signals directly to the first plurality of pins of the external connector 30. The switching logic 46 comprises two CMOS switchbanks 46a and 46b. As shown, SCSI controller 0 provides SCSI signals to CMOS switchbank 46a. Ground signals are provided to CMOS switchbank 46b. The outputs of each of the CMOS switchbanks 46a and 46b are provided as external bus 0 to the second plurality of pins of the external connector 30. The external connector 30 provides signals referred to as YLOOP and EXTIN to the cable sense control logic 50. The YLOOP signal is a sense signal used according to the present invention to detect the presence of the custom Y cable plugged into the external connector 30. As shown in FIG. 6, the Y cable generates the two YLOOP signals on predetermined ground pins that are provided through the external connector 30 to the cable sense control logic 50 to inform the cable sense control logic 50 that the Y cable is inserted into the external connector 30. The EXTIN signals are ground sense signals used to detect the presence of externally connected SCSI devices. It is noted that these lines are grounded by SCSI devices according to the SCSI-3 specification. The cable sense control logic 50 generates a switch control signal that is provided to CMOS switchbanks 46a and 46b. The cable sense control logic 50 also provides a cable status signal to each of the SCSI controllers, SCSI controller 0 and SCSI controller 1.

In the preferred embodiment, the cable sense logic 50 on the adapter card 22 continuously auto senses which cable is installed at power up. The CMOS switch banks 46a and 46b comprise low impedance CMOS analog switches which are cross-bar type and which are used to route either SCSI bus 0 or the ground signals to the external connector 30 depending on whether the Y cable 70 is detected. If the Y cable 70 is detected, the YLOOP signal is provided to the cable sense control logic 50 and the cable sense control logic 50 switches in the second SCSI bus, SCSI bus 0, into the second plurality of signal pins of the external connector 30. If the Y cable 70 is not detected, the external connector bus 0 pins, i.e., the second plurality of signal pins, are pulled to ground through the active switches. The cable sense control logic 50 comprises a state machine control block that continuously monitors the cable presence bit and controls the routing of SCSI bus 0. Because this type of control logic is well known in the art, details of its operation are omitted for simplicity.

Figure 4:
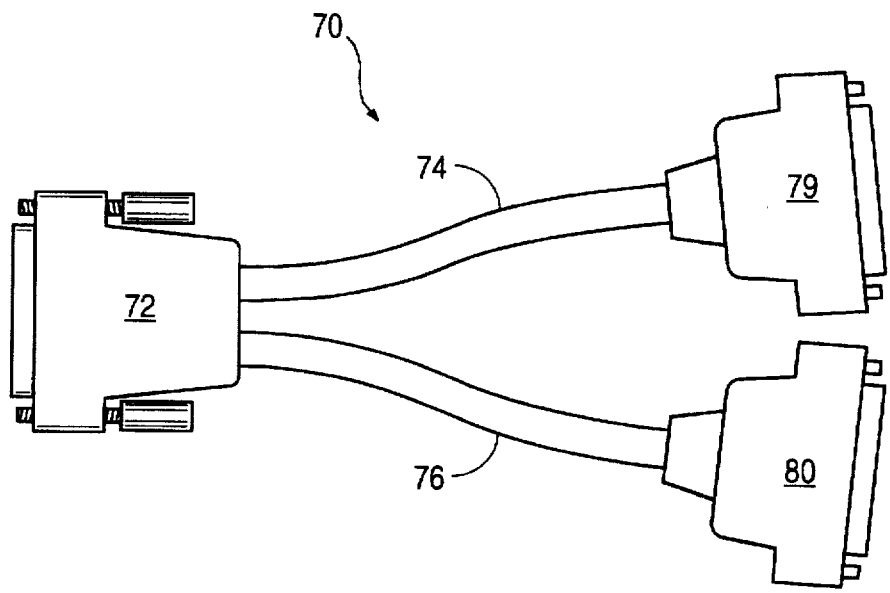
FIG. 4 illustrates the "Y" cable according to the present invention.

Referring now to FIG. 4, the Y cable 70 according to the preferred embodiment of the invention is illustrated. As shown, the Y cable 70 includes a first connector 72 which conforms to the connector pinout definition of FIG. 6. The first connector 72 of the Y cable 70 separates out into two legs 74 and 76 which each have respective connectors 79 and 80. The two legs 74 and 76 of the SCSI Y cable 70 are pinned out as standard SCSI-3 ports with an external cable sense signal according to the present invention, and also preferably with an additional three hot plug signals. The three hot plug signals are referred to as SDA, SLL, and DRVINT in the pinout definition of FIG. 6. The external cable sense signal is referred to as YLOOP. These four signals were stolen from non-impedance critical ground signal pins. In other words, four ground signal pins are no longer used as ground pins, but rather used as three hot plug signals and a cable sense signal.

As discussed in the background section, the standard SCSI-3 connector comprises 68 pins, wherein approximately 30 pins are used for address, data and control signals and the remaining pins are designated as ground pins. Thus, the SCSI-3 connector essentially includes a one-to-one ratio of signal and ground pins. The present invention can be used for any type of connector format which includes a number of ground lines equal to or greater than the number of non-ground signal lines, i.e., a number of ground lines equal to or greater than the number of address, data and control signal lines.

As discussed above, when the Y cable 70 is connected to the SCSI connector 30, the SCSI address, data and control signals corresponding to two SCSI channels are routed through the 68 pins of the connector 30 to the Y cable 70, and preferably no ground signals are provided through the connector 30. The connector 30 is preferably a shielded connector and includes large ground lugs 32 which provide a ground to the Y cable 70, and the Y cable 70 recreates the ground signals using the ground provided from the connector 30. In other words, the Y cable 70 receives the data and control signals for each of the two SCSI channels, splits the respective data and control signals for each channel into separate cable legs 74 and 76, and uses the ground lugs 32 and shielded connector 30 to recreate ground signals that are provided as the ground signals for each of the respective channels on the Y cable 70. When the Y cable 70 is connected to the grounds on the connector 30, contacts within the Y cable 70 receive the ground. This ground essentially substitutes for the ground pins that are not provided to the Y cable 70. When the Y cable 70 splits off the respective signals into separate cables for the respective separate channels, the Y cable 70 creates a drain wire which is used to tap off the 30 ground wires to complete the respective twisted pair of cable.

Figure 5:
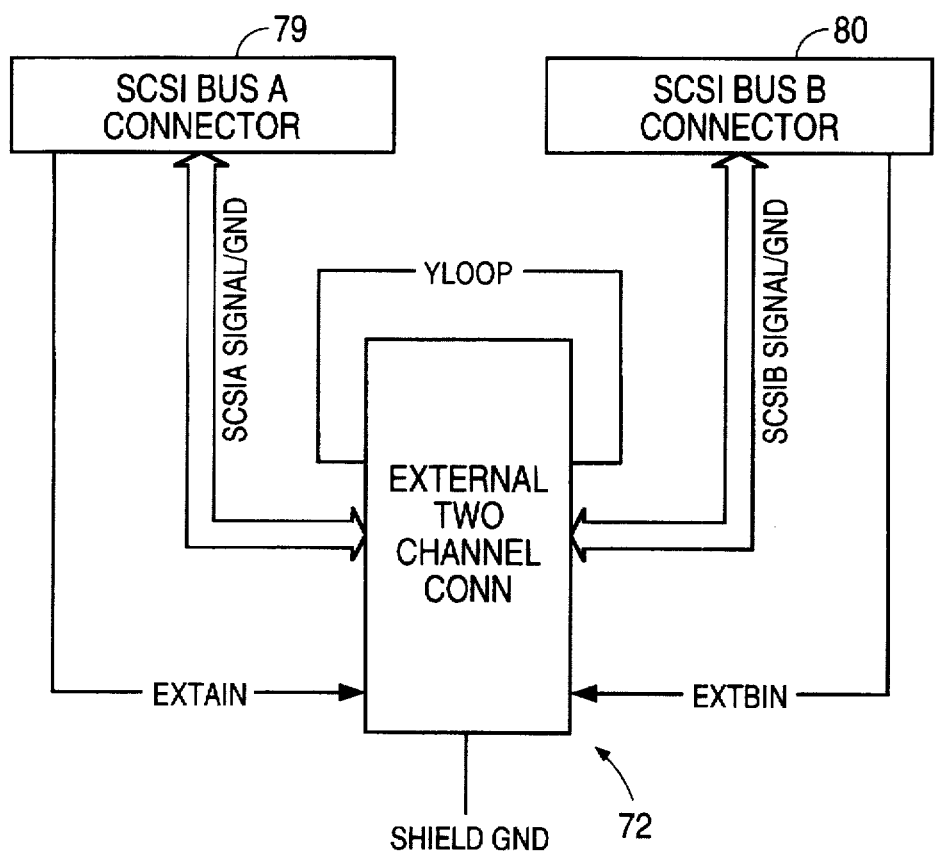
FIG. 5 is a block diagram illustrating the internal components of the "Y" cable of FIG. 4.

Referring now to FIG. 5, a block diagram illustrating the internal configuration of the SCSI Y cable 70 according to the preferred embodiment of the invention is shown. As shown, the external dual channel SCSI Y cable 70 includes a center tap 72 that mates to the connector pinout definition of FIG. 6. The dual channel connector or center tap 72 provides the respective address, data and control signals for each respective channel to respective SCSI bus connectors referred to as SCSI bus A connector designated 79 and SCSI bus B connector designated 80. Impedance-matching ground wires are ganged at the center connector 72 and are shorted to the connector shell on the connector 30 and provide a low RF impedance mate to the signal ground on the adapter card 22.

It is noted that providing the ground from the external connector 30 to the dual channel Y cable 70 essentially results in a stub of approximately one-half to three-quarters of an inch where impedance control is no longer available. However, in general, typical SCSI connectors also lack impedance control when the cables are separated by one or more connectors because the dielectrics generally differ. This discontinuity that results from crossing the connector 30 to the Y cable connector 72 is considered negligible. The transmission line effect of providing the ground across the external connector 30 to the Y cable 70 is generally insignificant because the distance where there is loss of ground signal is very short. Thus, the travel time of the electrons passing through this small distance is short. Also, there is a relatively small impedance mismatch which produces very little reflection. Therefore, providing grounds across the external connector to the Y cable 70 produces a very negligible loss of the ground signal, and thus the reliability of the SCSI signals is not impacted.

Therefore, the present invention comprises a SCSI connector 30 and associated switching logic 46 which enables the connector 30 to support either single or dual SCSI channels. The connector 30 is a standard connector that preferably conforms to the SCSI-3 format and can receive a standard single SCSI channel cable like any other SCSI connector. However, the SCSI connector 30 includes associated switching logic 46 and cable sense control logic 50, wherein the cable sense control logic 50 detects whether a single channel cable 69 or a special dual channel Y cable 70 is connected to the connector 30 and switches in ground signals or signals corresponding to a second SCSI channel accordingly. Therefore, the present invention provides a standard SCSI connector which supports either a single SCSI channel or dual SCSI channels. This provides increased connectivity from a single standard SCSI connector, while also providing modularity and upgradability.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer system including a connector which can support either one or two small computer systems interface (SCSI) channels, comprising:

a connector which is adapted to receive either a standard single channel SCSI cable or a dual channel SCSI cable;

a first SCSI controller coupled to said connector which provides first SCSI signals to a first plurality of pins of said connector;

a second SCSI controller which generates second SCSI signals; and switching logic coupled to said connector and said second SCSI controller which receives said second SCSI signals and selectively provides said second SCSI signals to a second plurality of pins of said connector if said dual channel SCSI cable is detected, said second SCSI signals being provided to said second plurality of pins concurrently with said first SCSI signals from said first SCSI controller.

2. The computer system of claim 1, wherein said switching logic receives a plurality of ground signals, wherein said switching logic provides said plurality of ground signals to said second plurality of pins of said connector if said single channel SCSI cable is detected.

3. The computer system of claim 1, further comprising:

cable sense logic coupled to said connector and said switching logic which determines whether said dual channel cable is connected to said connector and provides a signal to said switching logic indicative thereof.

4. The computer system of claim 3, further comprising:

a dual channel Y cable adapted for coupling to said connector, wherein said dual channel Y cable includes a first connector for coupling to said connector and includes first and second legs which connect to second and third connectors, respectively, wherein said first and second legs each conduct signals corresponding to SCSI bus channels;

wherein one or more SCSI devices may be coupled to each of said second and third connectors.

5. The computer system of claim 4, wherein each of said second and third connectors of said dual channel Y cable are configured according to standard SCSI-3 port specifications.

6. The computer system of claim 4, wherein said dual channel Y cable includes at least one ground signal pin that is configured as an external cable sense signal; and wherein when said dual channel Y cable is connected to said connector, said dual channel Y cable provides said external cable sense signal to said cable sense logic.

7. The computer system of claim 4, wherein said connector comprises a shielded connector which provides a ground to said dual channel Y cable.

8. The computer system of claim 7, wherein said dual channel Y cable includes a plurality of impedance matching ground wires;

wherein said plurality of impedance matching ground wires are ganged at said first connector; and wherein when said dual channel Y cable is connected to said connector, said plurality of impedance matching ground wires are shorted to said connector and provide a low RF impedance mate to a signal ground on said connector.

9. The computer system of claim 1, wherein said switching logic comprises low impedance CMOS analog switches.

10. The computer system of claim 1, wherein said connector is mechanically compatible with a standard SCSI-3 connector socket.

11. A method for selectively providing dual small computer systems interface (SCSI) channels on a single standard SCSI connector in a computer system, comprising the steps of:

providing a first plurality of SCSI signals from a first SCSI controller to a first plurality of pins of the SCSI connector;

coupling a dual channel Y cable to the SCSI connector; said dual channel Y cable providing a cable sense signal to the computer system indicating that said dual channel Y cable is coupled to the SCSI connector; and switching in a second plurality of SCSI signals from a second SCSI controller to a second plurality of pins of the SCSI connector in response to receiving said cable sense signal indicating said dual channel Y cable is connected to the SCSI connector, said second plurality of SCSI signals being provided to said second plurality of pins concurrently with said first plurality of SCSI signals to said first plurality of pins.

12. The method of claim 11, further comprising:

coupling a single channel SCSI cable to the SCSI connector; and switching in a plurality of ground signals to said second plurality of pins of the SCSI connector in response to said step of coupling said single channel SCSI cable to the SCSI connector.

13. The method of claim 11, further comprising:

the SCSI connector providing a ground to said dual channel Y cable after said step of coupling said dual channel Y cable to the standard connector; and the dual channel Y cable using said ground to generate a plurality of ground signals for each of said dual channels.

14. A computer system including a connector based on a first bus standard which can support either one or two bus channels according to said first bus standard, wherein said first bus standard defines a bus channel with a first number of ground signal lines and a second number of address, data and control signal lines, wherein said first number is equal to or greater than said second number, the computer system comprising:

a connector which is adapted to receive either a single channel cable or a dual channel cable;

a first controller coupled to said connector which provides first signals according to said first bus standard to a first plurality of pins of said connector;

a second controller which generates second signals according to said first bus standard; and switching logic coupled to said connector and said second controller which receives said second signals from said second controller and selectively provides said second signals to a second plurality of pins of said connector if said dual channel cable is detected, said second signals being provided to said second plurality of pins concurrently with said first signals from said first controller.

15. The computer system of claim 14, wherein said switching logic receives a plurality of ground signals, wherein said switching logic provides said plurality of ground signals to said second plurality of pins of said connector if said single channel cable is detected.

16. The computer system of claim 14, further comprising:

cable sense logic coupled to said connector and said switching logic which determines whether said dual channel cable is connected to said connector and provides a signal to said switching logic indicative thereof.

17. The computer system of claim 16, further comprising:

a dual channel Y cable adapted for coupling to said connector, wherein said dual channel Y cable includes a first connector for coupling to said connector and includes first and second legs which connect to second and third connectors, respectively, wherein said first and second legs each conduct signals corresponding to said first bus standard;

wherein one or more devices may be coupled to each of said second and third connectors.

18. The computer system of claim 17, wherein said dual channel Y cable includes at least one ground signal pin that is configured as an external cable sense signal; and wherein when said dual channel Y cable is connected to said connector, said dual channel Y cable provides said external cable sense signal to said cable sense logic.

19. The computer system of claim 18, wherein said connector comprises a shielded connector which provides a ground to said dual channel Y cable.

20. The computer system of claim 19, wherein said dual channel Y cable includes a plurality of impedance matching ground wires;

wherein said plurality of impedance matching ground wires are ganged at said first connector;

wherein when said dual channel Y cable is connected to said connector, said plurality of impedance matching ground wires are shorted to said connector and provide a low RF impedance mate to a signal ground on said connector.

* * * * *